No. 736,257. PATENTED AUG. 11, 1903.
E. M. HEYLMAN.
PLANTER.
APPLICATION FILED JAN. 6, 1903.
NO MODEL. 3 SHEETS—SHEET 1.

Witnesses:
Fred G. Clark
Alberta Adamick

Inventor:
Edward M. Heylman
By Peirce & Fisher
Attorneys.

No. 736,257. PATENTED AUG. 11, 1903.
E. M. HEYLMAN.
PLANTER.
APPLICATION FILED JAN. 6, 1903.
NO MODEL. 3 SHEETS—SHEET 2.

Witnesses:
Fred Gerlach
Alberta Adamick

Inventor:
Edward M. Heylman
By Peirce & Fisher
Attorneys

No. 736,257. PATENTED AUG. 11, 1903.
E. M. HEYLMAN.
PLANTER.
APPLICATION FILED JAN. 6, 1903.
NO MODEL. 3 SHEETS—SHEET 3.
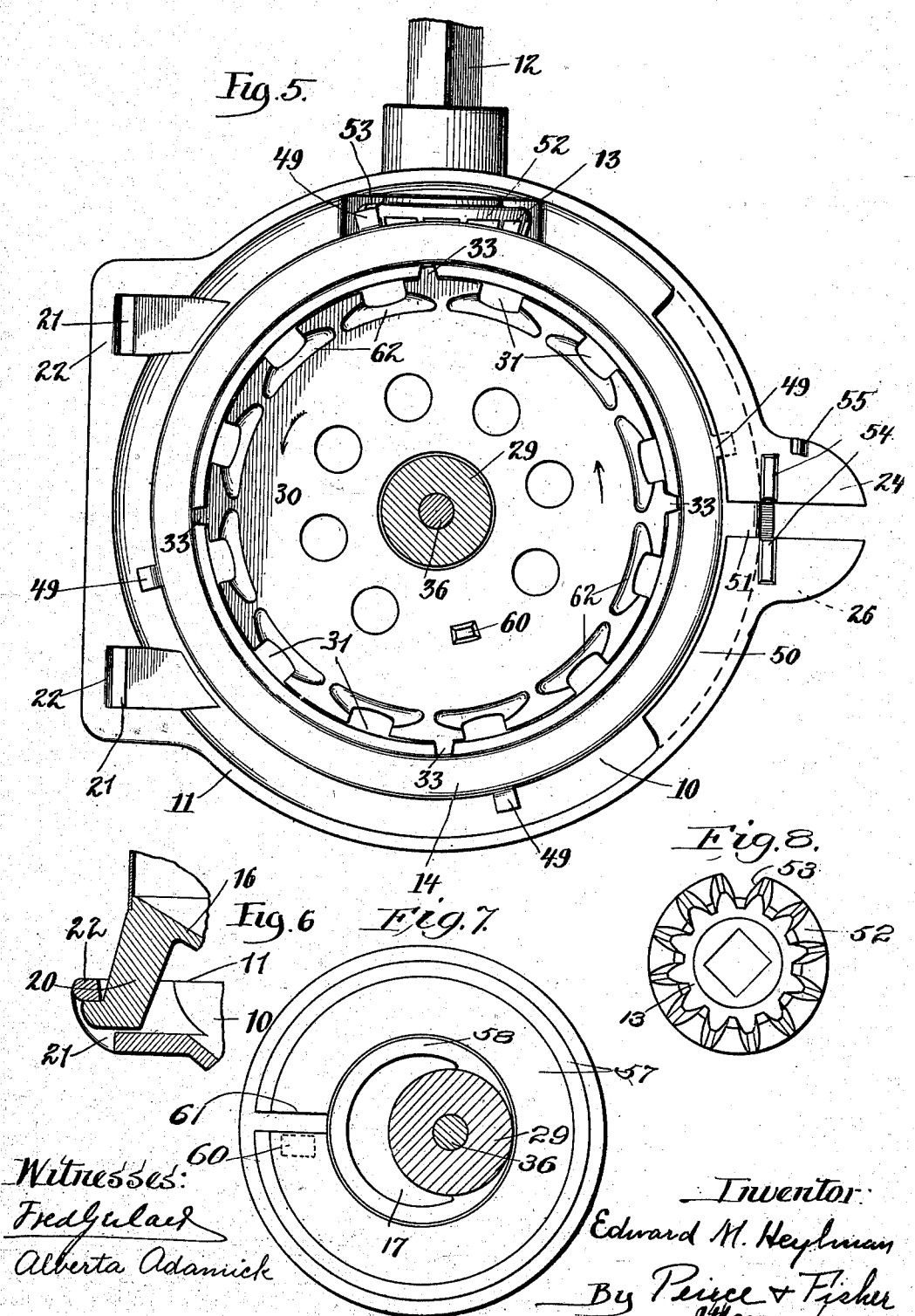

No. 736,257.　　　　　　　　　　　　　　　　　　　Patented August 11, 1903.

UNITED STATES PATENT OFFICE.

EDWARD M. HEYLMAN, OF JANESVILLE, WISCONSIN, ASSIGNOR TO THE JANESVILLE MACHINE COMPANY, OF JANESVILLE, WISCONSIN, A CORPORATION.

PLANTER.

SPECIFICATION forming part of Letters Patent No. 736,257, dated August 11, 1903.

Application filed January 6, 1903. Serial No. 138,003. (No model.)

*To all whom it may concern:*

Be it known that I, EDWARD M. HEYLMAN, a citizen of the United States, and a resident of Janesville, county of Rock, and State of Wisconsin, have invented certain new and useful Improvements in Planters, of which the following is declared to be a full, clear, and exact description.

The invention relates to seed-dropping mechanism and the actuating-gearing therefor of planters particularly designed for planting corn. The improvement seeks to provide the seed-box or hopper, which is preferably removable for refilling or for interchange of the seed-plate, with operating-gearing which cannot be placed in position "out of time."

Further objects of the invention are to provide improved means for charging the cells of the seed-plate and to simplify the arrangement of the removable seed-plate and gear.

The invention consists in the features of construction and arrangement of parts set forth in the following description, illustrated in the accompanying drawings, and more particularly pointed out in the appended claims.

Figure 1:
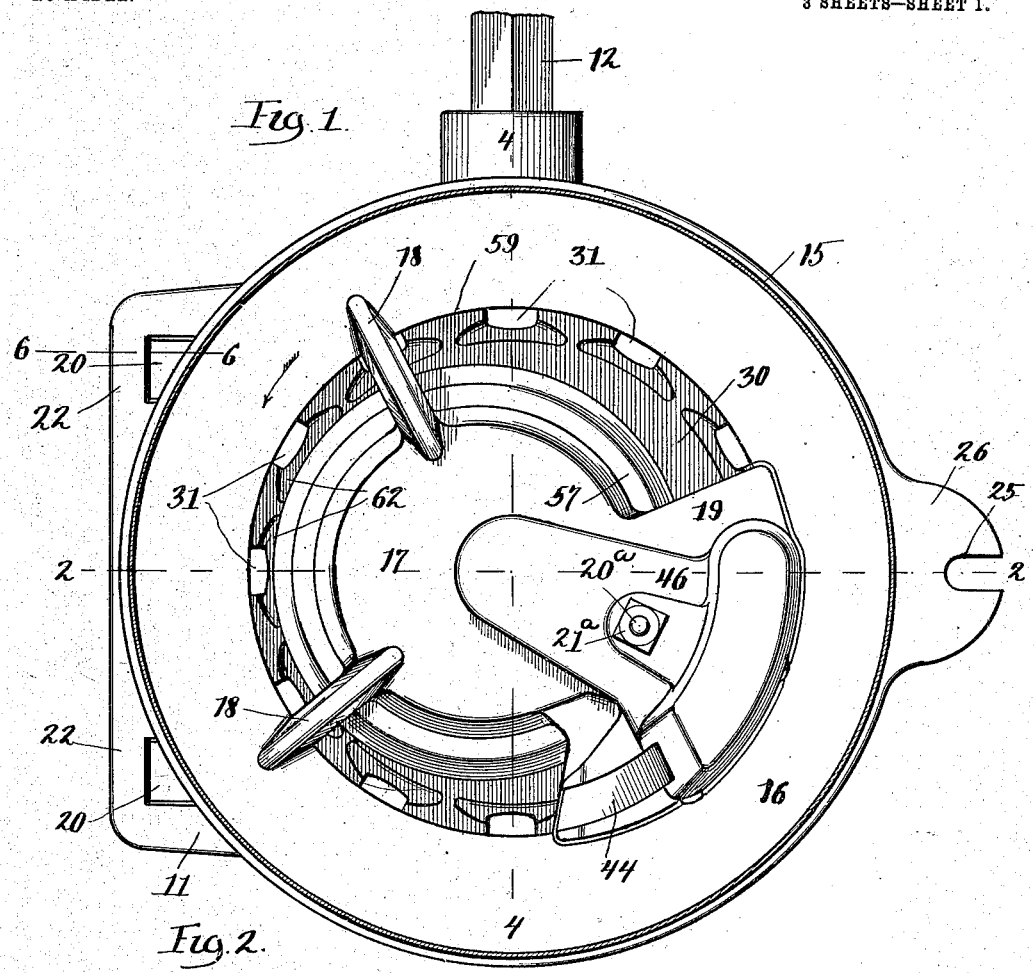
Figure 2:
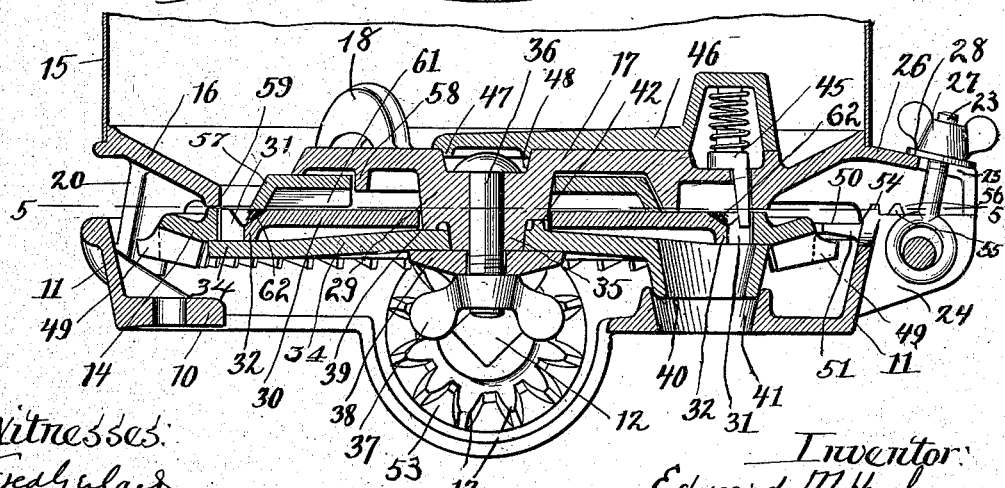
Figure 3:
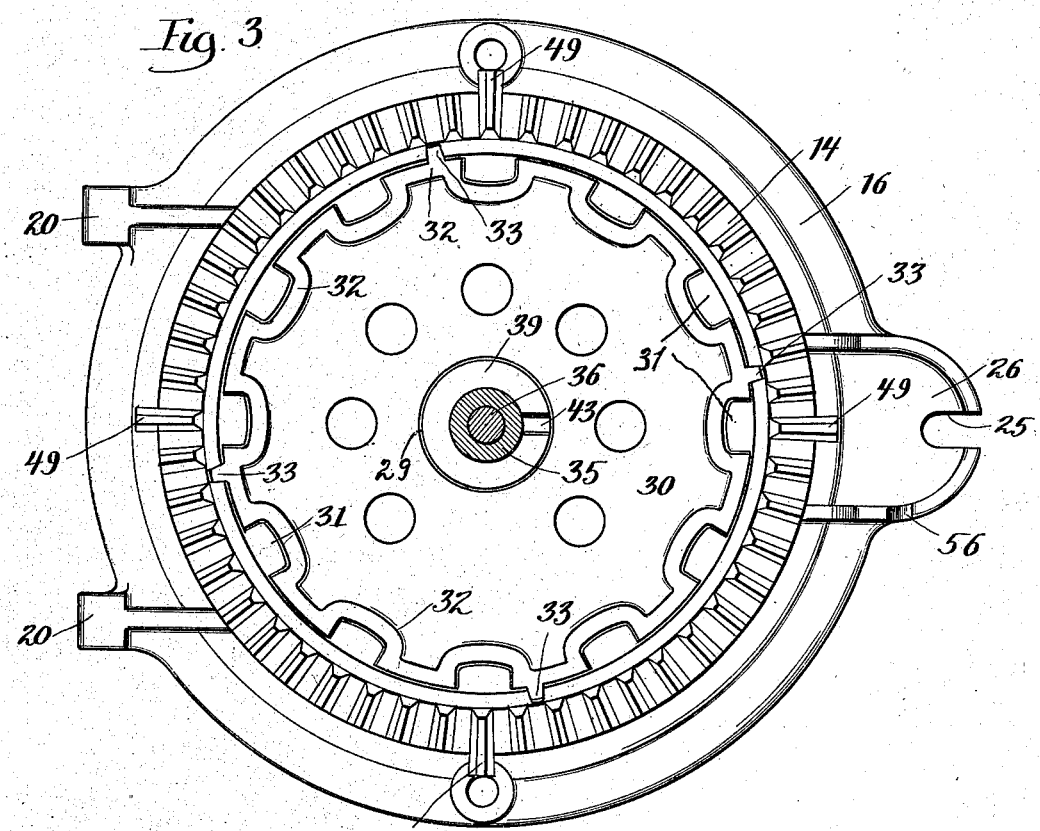
Figure 4:
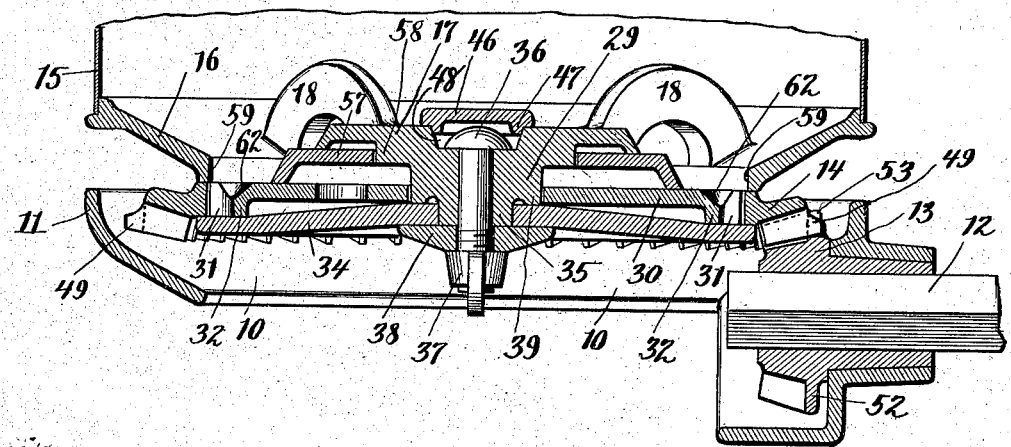

In the drawings, Figure 1 is a plan view of the seed box or hopper to which the improvements are applied. Fig. 2 is a section thereof on line 2 2 of Fig. 1. Fig. 3 is an inverted plan view of the seedbox-bottom with the bottom plate removed. Fig. 4 is a section on line 4 4 of Fig. 1. Fig. 5 is a section on line 5 5 of Fig. 2. Fig. 6 is a detailed section on line 6 6 of Fig. 1. Fig. 7 is an inverted plan view of the feed-disk and the parts on which it is journaled. Fig. 8 is a detail view of the drive-pinion.

A ring-support 10, having an upstanding edge flange 11, is attached to and forms part of the machine-frame. In the ordinary manner two of such supports are provided on opposite sides of the machine, and between them extends the rotating operating-shaft 12, which may be revolved in any suitable manner, as by sprocket-wheel and chain (not shown) driven from the wheel-axle of the planter. (Not shown.) Within the support 10 and upon the end of the shaft 12 is mounted a beveled drive-pinion 13, which meshes with the teeth of a beveled actuating gear-ring 14, sustained upon the bottom of the seed box, hopper, or can 15. The bottom of the seedbox comprises an annular portion 16 and a central cap portion 17, connected thereto by the arches 18 and the portion 19, all preferably formed of a single casting. The seed box or hopper is removably held in position upon the support 10, preferably by means of a pair of downwardly-extending hooks 20 on the hopper-bottom, which engage openings 21, formed in the rear part of the upstanding flange 11. The top edges 22 of these slots form pintles, which are engaged by the ends of the hooks 20 in such a manner that the seedbox is hinged at this point to the support, but, if desired, may be entirely removed therefrom. The seedbox is locked to the support by a bolt 23, pivoted to an extension 24 on the support 10 diametrically opposite the pintle-and-hook connections. The bolt 23 is adapted to be swung upwardly through a slot 25 in a projecting portion 26 of the hopper-bottom, and a thumb-nut 27 is threaded upon the end of the bolt, which when screwed down into engagement with the projecting portion 26 securely holds the seedbox in position. Preferably a washer 28 is interposed between the thumb-nut 27 and the projection 26.

The cap portion 17 of the hopper-bottom is provided with a downwardly-extending hub 29, which is concentric with the ring portion 16 of the hopper-bottom, and upon this hub is journaled the rotating seed-plate 30, the outer edge of which is positioned below and adjacent the inner edge of the bottom ring 16. (See Figs. 2 and 4.) The edge of the seed-plate is notched to form elongated seed cups or cells 31, arranged end to end in a circular series, and the cells are preferably adapted to receive single kernels of corn arranged lengthwise and on edge. To provide a deep cell from which the kernels cannot be easily swept by the overlying grain, the seed-plate 20 is preferably provided with a downwardly-depending flange 32, (see Figs. 3 and 4,) which extends about the edge of the plate and about the seed-cells 31.

The seed-plate 30 fits, as shown, within the annular actuating-gear 14 and is provided on its periphery with a series of projecting lugs 33, which engage notches formed on the inner edge of the ring-gear 14. The latter, as shown, abuts against the lower edge of the bottom ring 16 and is held in place, together with the seed-plate 30, by a circular plate 34, fitted over a reduced end portion 35 of the hub 29. Plate 34 is, as shown, of slightly larger diameter than the seed-plate 30 in order to properly engage the inner edge of the gear-ring 14, and this plate 34 is held in position by a bolt 36, which extends downwardly through the cap portion 17 of the box-bottom and through the hub 29 and to the lower end of which is threaded a thumb-nut 37. A washer 38 is interposed between the thumb-nut 37 and the reduced portion 35 of the hub 29, and this washer is of larger diameter than the reduced portion 35, so as to properly engage the plate 34 and support the latter, together with the seed-plate 30 and gear-ring 14, securely in position. The plate 34, however, bears against the shoulder 39 on the hub 29, so that the gear-ring and seed-plate may freely revolve. The outer edge of the circular plate 34 in the manner clearly shown in Figs. 2 and 4 closes the bottoms of the seed-cells 31, except at one point, where a flanged discharge-opening 40 is provided, which registers with an opening 41, formed in the support 10 and through which the kernels pass to the usual boot.

It will be seen that the can may be readily tilted or removed from the support 10, and by unscrewing the thumb-nut 37 the seed-plate can be easily and quickly changed without removing the contents of the can.

A stop-lug 42 (see Fig. 2) is formed on the plate 34 and is adapted to engage with a notch 43, (see Fig. 3,) formed on the shoulder portion 39 of the hub 29. By this expedient the plate 34 can only be replaced in proper position to bring the discharge-opening 40 therein over the discharge-opening 41 in the support 10. The lug could be formed upon the shoulder 39 and the notch in the plate 34. It is only necessary that a registering stop-lug and notch be interposed between these parts.

The portion 19 of the can-bottom (see Figs. 1 and 2) carries the usual spring-actuated cut-off 44 and the spring-actuated ejector 45. These parts are held in position by a casting 46, which is secured to the portion 19 of the can-bottom by a bolt 20ª and a nut 21ª. The casting 46 extends inwardly toward the center of the can-bottom, at which portion it is provided with a circular flange 47, engaging a depression or recess 48 in the cap portion 17 of the can-bottom. The head of the bolt 36 is, as shown, positioned within this recess 48 and below the end of the casting 46, so that it cannot drop out of place when the nut 37 is removed for changing the plates. The end of the cut-off 44 (see Fig. 1) is not arranged in radial position, but is inclined rearwardly, so that the kernels that are swept back by it are not liable to be broken.

Gear-ring 14 (see Figs. 2, 3, 4, and 5) is provided on its outer periphery with a series of uniformly-spaced projecting lugs 49, and these lugs are preferably formed by extending certain of the teeth of the gear at proper intervals. The flange 11 of the support 10 is provided (see Figs. 2 and 5) at its upper edge and opposite the pintle-and-hook connections described with a segmental stop-flange 50, which extends inwardly over the path of movement of the lugs 49. This flange is of a length at least equal to the spaces between the lugs 49 and is preferably provided with a central notch 51, through which the lugs 49 pass when the can is moved from or toward the support 10. By this expedient the hopper can only be moved from or toward the support 10 when the gear-ring is in position to bring one of the lugs 49 in register with the notch 51—that is to say, the can can only be placed on its support when the actuating-gear 14 is "in time"—i. e., in such position that the seed-cells 31 properly register with the discharge-opening. To insure that the ring-gear 14 and the drive-pinion 13 shall mesh in time, the drive-pinion 13 is provided (see Figs. 4, 5, and 8) with a flange 52 at the base of the teeth, which has a notch 53, preferably opposite one of the spaces between two adjacent teeth, with which notch the lugs 49 on the gear 14 engage.

In placing the seedbox in position on the support 10 the gear-ring 14 must be in position to bring one of the lugs 49 opposite the notch 51 in the stop-flange 50, in which position, as shown in Fig. 5, one of said lugs will be directly above the drive-pinion 13, and the drive-pinion 13 must be in position to bring the notch 53 in uppermost position to engage the lug 49 above the drive-pinion. By this arrangement it is impossible to place the seed-can on its support and intermesh gear 14 and pinion 13 out of time, and the proper registering of the seed-cells with the discharge-opening is insured.

The projection 26 on the seedbox-bottom opposite the pintle-and-hook connections (see Figs. 2, 3, and 5) is recessed or cut away on its under face, and the projection 24 beneath it on the support 10 is provided with lugs 54, which when the seedbox is in position extend upwardly to some extent into the recessed portion 26 and engage the side walls of the recessed projection, as indicated in Fig. 5, in which the side walls of the projection 26 are shown in dotted lines. This arrangement prevents any lateral movement of the seedbox when secured in position. On one side of the projection 24 (see Figs. 2 and 5) is provided an identifying stop-lug 55, which engages a correspondingly-shaped notch 56 (see Figs. 2 and 3) in one of the side walls of the recessed projection 26 on the can-bottom. As stated, there are two boxes or hoppers on opposite sides of the machine, and the seed mechanisms therein are operated by drive-pinions on opposite ends of the seed-shaft 12. Since the identifying stop-lug 55 and notch 56 are on the inner side only of the projections 24 and 26, they would not register if both right and left hand cans were removed and if an attempt were made to place the left-hand can on the right-hand support, or vice versa. If it were possible to so interchange the cans, the seed-plates instead of rotating toward the cut-off in proper manner would rotate in opposite direction away therefrom. This expedient therefore prevents any improper interchange of the removable seed-boxes. The stop-lug could be placed upon the projection 26 and the notch with which it registers placed upon the projection 24. It is only necessary that the identifying stop-lug and notch should be interposed between the support and the box-bottom.

Between the seed-plate 30 and the cap portion 17 of the hopper-bottom is interposed an eccentric feeder-disk 57 in the manner set forth in Letters Patent of the United States No. 699,754, issued to L. P. Graham on May 13, 1902. This feeder-disk is circular and is journaled upon an eccentric hub-rim 58, (see Fig. 7,) which projects downwardly from the under face of the cap portion 17. The circular feeder-disk 57 is positioned within the circular series of cells 30, and its outer edge, which is preferably beveled, at its nearest approach to the edge of the seed-plate approximately coincides with the inner side walls of the cells. The walls of the annular bottom ring 16 on the opposite sides of the seed-cells is preferably vertical immediately opposite the eccentric feeder-disk, as shown at 59. The eccentric feeder-plate 57 is preferably rotated as described in said prior Letters Patent, above referred to, by a lug 60 on the seed-plate, which engages a downwardly-projecting rib 61 (see Figs. 2, 5, and 7) on the eccentric disk. As the seed-plate rotates, any particular portion of the eccentric feeder-disk moves to and from the seed-cells and serves to push the kernels toward the cells and at its point of nearest approach to the edge of the seed-plate tends to uptilt them, so they may readily enter the cells or cups on edge. By this means the seed cups or cells are uniformly charged with single kernels of corn. In the present construction the metal body of the plate is beveled or cut away opposite the cells to form inclines 62, which extend upwardly from the inner side edges only of the seed-cups 31. These inclines preferably extend up from a point midway between the top and bottom of the cells or a little above this point and are arranged at an angle of about thirty degrees to the horizontal. It has been found in practice that such inclines over which the kernels are pushed into the cells by the operation of the feeder-disk materially increase the efficiency of such disk and facilitate the uptilting of the grains on edge. Preferably, as clearly shown in Figs. 1 and 5, the inclines 62 extend forwardly in the direction of the rotation of the seed-plate (indicated by arrows in Figs. 1 and 5) to lead the separate kernels into the cells. Preferably, also, the inclines diverge upwardly from the inner side edges of the seed-cells both in forward and backward direction with reference to the rotation of the seed-plate, so that the plates may be used interchangeably in either the right or the left hand seedbox. As shown in Fig. 1, the feeder-disk 57 at the point nearest its approach to the edge of the seed-plate 30 covers the greater part of the inclines 62. It is obvious that as the feeder-disk moves to and from the cells the kernels will be pushed by the operation of the feeder-plate over and down the inclines, and the latter will aid materially in charging the seed cups or cells and also in uptilting the grains on edge.

The details of structure described may be varied by the mechanic's skill without departure from the essentials of the invention.

Having described my invention, what I claim as new, and desire to secure by Letters Patent, is—

1. In planters, a stationary support on the machine-frame, a seedbox movably mounted on said support, a seed-plate-actuating gear revolubly mounted upon the bottom of said box, a drive-pinion for said actuating-gear mounted below said seedbox, a segmental stop-flange mounted on said stationary support and lugs rotating with said seed-plate-actuating gear and coöperating with said stop-flange.

2. In planters, a support on the machine-frame, a seedbox movably mounted on said support, a seed-plate-actuating gear revolubly mounted upon the bottom of said box, a drive-pinion for said actuating-gear mounted below said seedbox, a series of uniformly-spaced lugs mounted on said actuating-gear and a stop-flange mounted on said support concentric with said gear and coöperating with said lugs.

3. In planters, a support on the machine-frame, a seedbox mounted on said support, a beveled, seed-plate-actuating gear revolubly mounted on the bottom of said box, a beveled drive-pinion for said gear mounted below said seedbox, a series of uniformly-spaced lugs on said actuating-gear, a segmental stop-flange mounted on said support concentric with said gear and coöperating with said lugs and a notch in said drive-pinion also coöperating with said lugs.

4. In planters, a support on the machine-frame, a seedbox movably mounted on said support, hinged connections between said seedbox and said support, a seed-plate-actuating gear revolubly mounted on the bottom of said box, a drive-pinion for said actuating-gear mounted below said seedbox, a series of uniformly-spaced lugs on said seedbox and a notched segmental stop-flange mounted on said support diametrically opposite said hinged connections, said notched stop-flange coöperating with said lugs.

5. In planters, a support on the machine-frame, a seedbox removably mounted on said support, a seed-plate-actuating gear revolubly mounted on the bottom of said box, a drive-pinion for said gear mounted below said seedbox, a series of uniformly-spaced lugs on said actuating-gear and a segmental stop-flange on said support concentric with said gear and coöperating with said lugs, said stop-flange being substantially equal in length to the spaces between said lugs.

6. In planters, a support mounted on the machine-frame, a seedbox removably mounted on said support, pintle-and-hook connections between said seedbox and said support, a beveled, seed-plate-actuating gear revolubly mounted on the bottom of said box, a beveled drive-pinion for said gear mounted below said seedbox, a segmental notched flange on said support diametrically opposite said hinged connections and coöperating with said lugs and a notch in said beveled gear also coöperating with said lugs.

7. In planters, a stationary support on the machine-frame, a seed-can removably mounted thereon, a seed-plate and actuating-gear movably mounted on the can-bottom, a discharge-opening and cut-off coöperating with said seed-plate, a drive-pinion for said actuating-gear mounted below the seedbox, and an identifying stop-lug and a corresponding notch formed on said seed-can and said stationary support to prevent interchange of the right and left hand seed-cans and to insure that said plate will be driven toward said cut-off.

8. In planters, a stationary support on the machine-frame, a seedbox removably mounted on said support, pintle-and-hook connections between said seedbox and said support, a seed-plate and an actuating-gear rotatably mounted on the box-bottom, a discharge-opening and a cut-off coöperating with said seed-plate, a drive-pinion for said actuating-gear mounted below the box and an identifying stop-lug and a corresponding notch formed on said can and said stationary support opposite said pintle-and-hook connections to prevent the interchange of the right and left hand seed-cans and to insure that said plate will be driven by said gear toward said cut-off.

9. In planters, a seed-plate, seed-cells formed therein, a feeder above said seed-plate and movable toward and from said cells and inclines leading into said cells, the seed being pushed down said inclines into said cells by the operation of said feeder.

10. In planters, a horizontal, rotating seed-plate, elongated seed-cells therein arranged end to end in circular series, a feeder above said plate movable to and from said cells and inclines leading upwardly from the inner side edges of said cells, the seed being pushed down said inclines into the cells by the operation of said feeder.

11. In planters, a horizontal, rotating seed-plate, elongated seed-cells therein arranged end to end in circular series, a feeder above said plate movable to and from said cells and inclines leading upwardly and forwardly with reference to the rotation of said seed-plate, from the inner side edges of said cells.

12. In planters, a horizontal, rotating seed-plate, elongated seed-cells therein arranged end to end in circular series, a feeder above said plate movable to and from said cells and divergent inclines leading upwardly from the inner side edges of said cells.

13. In planters, a horizontal, rotating seed-plate, elongated seed-cells therein arranged end to end in circular series, an eccentric feeder-plate above said seed-plate and inclines leading upwardly from the inner side edges of said cells.

14. In planters, a horizontal, rotating seed-plate, elongated seed-cells therein arranged end to end in circular series, a rotating, beveled edge, eccentric feeder-plate above said seed-plate and divergent inclines leading upwardly from the inner side edges of said cells.

15. In planters, a horizontal, rotating seed-plate notched at its edge to form elongated seed-cells arranged end to end in circular series, a rotating eccentric feeder-plate above said seed-plate and divergent inclines leading upwardly from the inner side edges of said cells, said feeder-plate covering said inclines at its nearest approach to the edge of said seed-plate.

16. In planters, a horizontal, rotating seed-plate, elongated seed-cells therein arranged end to end in circular series, inclines leading upwardly and forwardly with reference to the rotation of said seed-plate from the inner side edges only of said seed-cells and means for pushing the kernels down said inclines into the cells.

17. In planters, a horizontal, rotating seed-plate, elongated seed-cells therein arranged end to end in circular series, divergent inclines leading upwardly from the inner side edges of said elongated seed-cells and means for pushing the kernels down said inclines into the cells.

18. In planters, a horizontal, rotating seed-plate notched at its edge to form elongated seed-cells arranged in circular series, divergent inclines leading upwardly from the inner side edges of said cells and an eccentrically-disposed feeder above said seed-plate for pushing the kernels down said inclines into the cells.

19. In planters, a seedbox, a seedbox-bottom comprising an annular ring and a cap portion secured together, a downwardly-extending hub on said cap portion, a seed-plate revolubly mounted on said hub, an actuating gear-ring surrounding said seed-plate, a retaining-plate for removably holding said gear-ring and seed-plate on the under side of the box-bottom, a discharge-opening in said retaining-plate and a registering stop-lug and notch between said retaining-plate and said hub.

20. In planters, a seedbox, a seed-plate rotatably mounted on the box-bottom and having notches in its edge to form seed-cups, an annular gear-ring surrounding said seed-plate and closing the open sides of said cups, notches on the inner periphery of said annular gear and projecting lugs on the outer periphery of said seed-plate engaging said notches.

EDWARD M. HEYLMAN.

Witnesses:
F. H. FARNSWORTH,
R. C. PURCELL.